United States Patent
Derevenko

(10) Patent No.: US 9,983,913 B2
(45) Date of Patent: May 29, 2018

(54) CHAINED USE OF SERIALIZING SYNCHRONIZATION TO OBTAIN EVENT NOTIFICATION TYPE SYNCHRONIZATION

(71) Applicant: Oleh Derevenko, Lviv (UA)

(72) Inventor: Oleh Derevenko, Lviv (UA)

(73) Assignee: Oleh Derevenko, Lviv (UA)

( * ) Notice: Subject to any disclaimer, the term of this patent is extended or adjusted under 35 U.S.C. 154(b) by 160 days.

(21) Appl. No.: 15/155,031

(22) Filed: May 15, 2016

(65) Prior Publication Data

US 2017/0329652 A1    Nov. 16, 2017

(51) Int. Cl.
| | | |
|---|---|---|
| *G06F 9/46* | (2006.01) | |
| *G06F 9/52* | (2006.01) | |
| *G06F 9/54* | (2006.01) | |

(52) U.S. Cl.
CPC ............... *G06F 9/52* (2013.01); *G06F 9/542* (2013.01)

(58) Field of Classification Search
None
See application file for complete search history.

(56) References Cited

U.S. PATENT DOCUMENTS

| | | | | |
|---|---|---|---|---|
| 7,478,403 B1* | 1/2009 | Allavarpu | ........... | H04L 41/0206 370/254 |
| 7,779,390 B1* | 8/2010 | Allavarpu | ........... | G06F 11/3664 717/124 |
| 2002/0122062 A1* | 9/2002 | Melamed | ........... | G06F 9/52 715/763 |
| 2005/0102681 A1* | 5/2005 | Richardson | ........... | G06F 9/526 719/321 |
| 2005/0289558 A1* | 12/2005 | Illowsky | ........... | G06F 1/3203 719/318 |
| 2008/0028196 A1* | 1/2008 | Kailas | ........... | G06F 9/445 712/245 |
| 2010/0054386 A1* | 3/2010 | Abel | ........... | H04J 3/0685 375/376 |
| 2011/0126174 A1* | 5/2011 | Krauss | ........... | G06F 11/3466 717/127 |
| 2014/0108867 A1* | 4/2014 | Ganai | ........... | G06F 11/1482 714/38.1 |
| 2014/0181833 A1* | 6/2014 | Bird | ........... | G06F 9/5016 718/105 |
| 2016/0019066 A1* | 1/2016 | Diamos | ........... | G06F 9/3867 712/228 |
| 2016/0188380 A1* | 6/2016 | Eastep | ........... | G06F 9/5094 718/104 |

* cited by examiner

*Primary Examiner* — Kenny S Lin

(57) ABSTRACT

A method of using means of serializing synchronization for achieving effects of event notification type synchronization for the case of a single predefined signaler.

7 Claims, No Drawings

US 9,983,913 B2

CHAINED USE OF SERIALIZING SYNCHRONIZATION TO OBTAIN EVENT NOTIFICATION TYPE SYNCHRONIZATION

CROSS-REFERENCE TO RELATED APPLICATIONS

Not Applicable

STATEMENT REGARDING FEDERALLY SPONSORED RESEARCH OR DEVELOPMENT

Not Applicable

REFERENCES TO COMPUTER PROGRAM LISTING COMPACT DISC APPENDIX

One CD (plus a duplicate) is included with the specification.

Disc 1 of 1.

| File Name | File Description |
| --- | --- |
| mutexgear.h.txt (created: 2016-MAY-14) (size: 26,163 bytes) | A header file of a sample implementation in C programming language of the invention algorithm for coordinated operations (the toggle family of functions) and independent operations (the wheel family of functions) in style of the POSIX Thread library (libpthread) using POSIX Thread mutex as the serializing synchronization object. |
| mutexgear.c.txt (created: 2016-MAY-14) (size: 19,796 bytes) | An implementation file matching the header file referenced above. |

BACKGROUND OF THE INVENTION

The present invention relates to thread execution synchronization in a software execution environment capable of parallel thread execution.

A thread is a sequence of instructions executed by a computer processor (or its equivalent) independently in parallel to or intermixed with other similar threads within the system.

Serializing synchronization is a mechanism allowing gaining logical ownership of a synchronization token by at most one thread at a time and suspending execution of any additional threads competing for the same token until the present ownership is released by the owning thread.

Event notification type synchronization is a synchronization mechanism allowing a thread or threads to suspend execution waiting on a synchronization token for an event announcement by any other thread. Whenever the event is announced (signaled), one of or all the suspended threads resume their execution.

Event notification type synchronization implementations typically lack some benefits available with serializing synchronization.

BRIEF SUMMARY OF THE INVENTION

The object of the present invention is to provide a method for partly achieving event notification type synchronization by means of serializing synchronization thus gaining the priority inheritance inherent to the serializing synchronization, potentially gaining improved performance of the latter, deadlock detection support, or any other features (all, if provided by the execution environment). The method is applicable for the case of a single predefined signaling thread and one or more waiting threads.

BRIEF DESCRIPTION OF THE SEVERAL VIEWS OF THE DRAWING

Not Applicable

DETAILED DESCRIPTION OF THE INVENTION

Explanations on and Definitions of Some Terms Used

The event notification type synchronization is a synchronization mechanism allowing a thread to wait (block and suspend execution) with aid of the mechanism until some other entity (another thread or the operating system itself) changes (possibly, transiently) the mechanism state to "signaled" and thus unblocks the waiting thread. Typically, this is used as a mean to notify the former thread of some event in the execution environment and let it resume execution only after the event of interest occurs. Examples of such type of synchronization mechanisms are POSIX conditional variable (a condvar) and Win32 EVENT object.

The serializing synchronization is a synchronization mechanism allowing itself to be acquired ("locked") by at most one thread at a time, blocking and suspending any additional concurrent acquisition attempts by other threads until the most recent thread having succeeded with the acquisition (the owner)—releases ("unlocks") the mechanism; then allowing another thread to resume and proceed with the acquisition, thus serializing execution of threads that have the mechanism acquired with respect to other threads competing for the same mechanism instance. Typically, this is used to ensure some predefined fragments of code are not executed in parallel by multiple threads. Examples of such types of synchronization mechanisms are POSIX mutual exclusion (a mutex) and Win32 CRITICAL_SECTION or MUTEX objects.

The Method

The effects of event type synchronization (namely, ability to block a thread and unblock it whenever a desired event is known to have happened) are achieved by chained re-locking two serializing synchronization objects.

Consider two serializing synchronization objects A and B as well as two execution threads: the Waiter (W) and the Signaler (S),—in the following way:

Preconditions

1. Initially, the A object is locked by the S thread.

Event Waiting

1. To wait for the event, the W thread has to execute a lock attempt with the A object.

2. After the lock succeeds the W thread is to immediately unlock the A object.

Event Signaling

1. To signal the event occurrence, the S thread locks the B object.
2. Then the S thread unlocks the A object.

The act of chained moving the lock from A to B (locking the B and unlocking the A with the "both objects locked" state in between) resulting in ability of the W thread to lock the A object, immediately unlock it and resume execution is equivalent to the event type synchronization signal desired.

After a single operation, the serializing synchronization object B can be renamed to A and another unlocked serializing synchronization object (possibly, the former A object) can be taken as B resulting in the system returning to the initial state with the W thread being able to wait for more event occurrences and the S thread being able to further signal them. The chained re-lock with "both objects locked" state is crucial to not allowing the W thread to start for the next operation ahead of time, while the precondition 1 is not met yet.

It can be also stated, that the W thread needs not to be the same physical thread each time, provided the access to the waiting feature is serialized.

On the other hand the S thread is not dependent on presence of the W thread and can operate alone. In that case the event "signals" are going to be lost similarly to the POSIX conditional variable object losing its signals if there are no threads waiting on it.

This mode of operation is named "Coordinated Operation Mode".

A restriction of the method is that the S thread must remain (virtually) the same for the whole lifetime of the mechanism. The word "virtually" in the previous sentence means that the S thread can actually be substituted with another physical thread by unlocking the A object and letting it to be locked by the said another thread, provided any W threads are restrained from wait attempts by external means for the duration of the substitution. Practically, this would be a shutdown of the method and its restart with another physical thread serving the S role.

While being blocked attempting to lock the A object in the step 1 (waiting for the event to be signaled) the W thread (and the method as a whole) can benefit from all the features that may be available with the serializing synchronization chosen. These include, but are not limited to: priority inheritance to the anticipated signaler (the S) thread; priority ceiling mechanism to raise the waiter's priority for the object lock duration; automatic deadlock detection features potentially provided by the system itself or any application libraries. These benefits are available neither with the standard POSIX conditional variable nor with the Win32 EVENT objects.

Since the serializing synchronization objects are potentially possible to be implemented the way to avoid entering the Operating System privileged mode in cases when the objects are unlocked and there is no contest from other threads for them, the invention object mechanism can benefit from performance improvements gained in the said cases, compared to the typical event notification synchronization objects (like POSIX condition variable or Win32 EVENT) which are required to enter the privileged mode on each wait or signal operation.

Both the steps 1-2 of the Event Waiting and the steps 1-2 of the Event Signaling can be implemented by Operating System as unitary operations for efficiency. Similarly, the entire invention object mechanism can be implemented within the Operating System as a unitary synchronization object. The Operating System implementation does not need to replicate the user level serializing synchronization objects exactly: any internal structure that would allow marking a logical object as owned by an S thread and suspending a W thread (with or without priority inheritance to the S thread) until the mark is moved to the next logical object will suffice.

An Implementation of Coordinated Operation Mode

For the method described above, to make a practical implementation it is sufficient to swap references to the A and B objects as viewed by the both W and S threads after each operation.

Namely, the algorithm can be described with the steps below.

Preconditions

1. Initially, the A object is locked by the S thread.

Event Waiting

1. The W thread executes a lock attempt with the A object.
2. After the lock succeeds the W thread immediately unlocks the A object.
3. The W threads swaps its local references to the A and B objects so that the object instance that was formerly referenced as B becomes A and vice verse.

Event Signaling

1. The S thread locks the B object.
2. The S thread unlocks the A object.
3. The S threads swaps its local references to the A and B objects so that the object instance that was formerly referenced as B becomes A and vice verse.

The W and S threads must execute their parts of the algorithm in a coordinated manner, with alignment on a common synchronization barrier (achieved by any means, either an external synchronization object, or an implicit execution blocker, or whatever) in between of operations, so that the number of waits of the W thread equaled to the number of event signals by the S thread. This is naturally achieved, when the S thread executes a job requested by the W thread and signals on completion, while the W thread can wait for that after having some additional tasks done in parallel. Another case could be both W and S threads being unblocked for a run by a common external source (or several cooperating external sources but still maintaining executions count balance—that is, provided that neither of the W and S threads executes twice in a row without parallel or interleaved execution of the other party and/or without aligning at a barrier synchronization to ensure that the preconditions for the next run are met).

Note that it obviously follows from the coordinated execution described above that the W thread "knows" which of the objects is being referenced as the A by the S thread: the A objects of both the W and the S, simply, match after each algorithm pass. The purpose of the A and B object reference swapping in the step 3 of the Event Waiting is for the W thread to remain in synchronization with the S thread and retain that knowledge so that it was possible to continue on subsequent passes.

Also note that this implementation can readily be used with more than one W thread simultaneously, provided that all such W threads still obey the coordinated execution requirement with respect to the S thread. All the W threads will actually execute their steps 1-2 of the "Event Waiting" sequentially, one after another (since two or more W threads by definition can't lock the same serializing A object at the same time), but from the practical perspective this is in most cases negligible and indistinguishable from parallel execution.

Finally note that as it was already mentioned above, the next pass's B object can but does not necessarily need to be the former A object. Thus, more than two objects could be used (though with no obvious benefits) and in that case the local references to A and B objects would start with the first two objects and would to be moved to respective next objects within the loop (which reduces to the plain swapping when there are just two of them).

An example of scheduling a task into a worker thread and waiting for its completion is presented in the "Some usage examples" section in commentaries at the end of the mutexgear.h.txt file on the Appendix CD as the number 1.

An Implementation of Independent Operation Mode

The requirement for the W and S threads to execute in coordinated manner and align on a barrier after each operation is a strong limitation. To remove it, three serializing synchronization objects A, B and C need to be used. Also, since the threads execute independently and the S thread may issue multiple event signals, a predicate V (e.g. a variable) needs to be used to contain an indication for the W thread that the event occurred is its event of interest. This mode of operation is named "Independent Operation Mode".

Preconditions

1. Initially, an arbitrary object of the three (say, the A object) is locked by the S thread.
2. The V predicate evaluates to "event did not happen" meaning.

Event Waiting

1. The W thread must initially lock without blocking any free object of the three. For that it starts from any of the objects (say, the C object) and tries to lock it abandoning the lock attempt (the "try-locking") if the objects is already locked by the S. If the object was successfully locked, the algorithm proceeds to the step 2. Otherwise, the W thread immediately tries to lock the B object, then the A object, and then starts over with the C object, and so on, until an attempt succeeds 2. The W thread checks if the V predicate evaluates to "event happened" meaning and exits to the step 3 if so. Otherwise, it performs one time re-lock of is owned object A, B or C to the next one: the B, C, or A respectively,—that is done by locking the next object first and then unlocking the current object with the "two neighbor objects locked" state in between. Then the W thread starts the step 2 over from the beginning.

Note that the W thread may become blocked temporarily while performing the re-lock if the next object is locked by the S thread at the time.

3. Having obtained the "event happened" value in evaluation of the V predicate, the W thread unlocks its currently owned object (A, B or C).

Event Signaling

1. If the event to be signaled is the event of interest for the W, the S thread changes the V predicate state so that it starts evaluating to an "event happened" meaning. Otherwise the V remains unchanged.

2. The S thread executes any one of the following options:

Option_1. The S thread re-locks its currently owned object to the next one, just like the W did: A, B or C to the B, C or A respectively—and remains with the next object locked as the precondition for the next operation. Note that the S thread may become blocked temporarily while performing the re-lock if the next object is locked by the W thread at the time.

Option_2. The S thread tries to lock the next object without blocking (the "try-locking") and unlocks the currently owned object if the former succeeds. If the try-locking fails, the S thread stays with its initial object locked.

If the next object is busy on the try-lock attempt, it's an indication that the W thread did not start or has not finished its re-locking in its respective step 2 yet and thus, it will be free to perform or complete that and is going to still re-evaluate the V predicate without blocking one time at least (either proceeding with the step 2 begin initially or having started the step 2 over). In that case the S thread can abandon re-locking to the next object and just stay with its current one keeping it locked as the precondition for yet one more operation.

Note that with the Option_2 the S thread operates without blocking and, since the priority inheritance from the S to the W thread is meaningless with most applications, this option is the preferred one. On the other hand, the Option_1 is exactly what the S thread did in the Coordinated Operation Mode. That is, it's the same algorithm for the S thread with addition of explicit event occurrence indication with the predicate before the signaling.

It's natural to choose a native atomic type for the V predicate (like a Boolean or an integer) to let the threads operate with it safely without need of additional protection on access. Nevertheless, the type of the V can be anything capable of carrying a Boolean information either in explicit or in a concealed form. If the V predicate is not natively atomic within the hardware architecture used, an extra serializing protection might be needed for its evaluation and change.

As it was already mentioned, this approach allows completely independent operation for both W and S threads with the V predicate serving as event state persistence storage. The S thread may signal events multiple times with different instances of V predicates or without those. Meanwhile, any of the W threads may wait for their respective events at any time, provided their access to the waiting operations is serialized by external means.

The reverse direction of initial mutex locking attempts in the step 1 of the "Event Waiting" is intended to avoid a possible livelock. If the normal direction would be used, the S thread could be signaling events advancing its locked object each time and the W thread could be synchronously trying to lock each such next object resulting in a livelock condition. Using the opposite directions makes this livelock much less likely to happen or much less likely to last for a substantial number of retries.

The W thread can't just unlock its running object and lock the next one afterwards like it was done in the Coordinated Operation Mode, since that would create the "all three objects available for the S" state. In that state, the S thread might signal the event of interest for the W thread with the V predicate change, and then signal a few more other events having paused for a while with the object locked being the one that the W thread would be intending to lock. The W thread would then block with the next object lock for potentially long or even infinite period, being not able to notice that its event of interest would have been already reported with the V.

This extended implementation, though at the cost of the extra (the third) serializing object, can be used just as a normal event notification synchronization object allowed for targeting a single event recipient at a time. However, as it was already mentioned, the method requires potentially less Operating System privileged mode entries and provides priority inheritance from the event waiter to the event intended signaler.

To allow multiple W threads waiting simultaneously each with its own predicate V to be signaled by the S thread, it is necessary to extend the A, B and C loop with more serializing synchronization objects. In general, having N>2 objects in the loop allows up to N−2 waiter threads to receive event notifications completely independently. All the implementation features and options from the above remain correct for the case, with a single exception that 2.—Option_2 of the "Event Signaling" may not be used. With more than one W threads the object next to one owned by the S thread being busy is no longer an indication that all the W threads still have an extra free algorithm pass available.

One of evident practical uses here could be a task queue handling. In this scenario, multiple client threads could add their tasks to be executed (with optional references to their completion indication predicates V) into a queue while a server thread would extract the queued tasks one at a time, execute them and signal the completion event to the client if the task record required that by having a V predicate reference assigned. Then the client threads could later wait for their tasks of interest to be accomplished propagating their potentially elevated priorities to the server thread for duration of the waiting.

Another obvious use could be a data queue with a single consumer thread. In case if data provider is the only thread as well, the invented event notifications could be used in both directions: one to let the queue data consumer know that the queue is not empty anymore and the other one to let the data provider know the queue is not full any more. In case of multiple data providers, they can rely on conventional event delivery mechanisms to notify the consumer about the queue becoming not empty and still use the invention event delivery method to wait for reverse notification about the queue some room availability with priority propagation to the consumer thread.

An example of waiting for some room to become available in a queue is presented in the "Some usage examples" section in commentaries at the end of the mutexgear.h.txt file on the Appendix CD as the number 2. Also, the number 3 there is an example of waiting for a handler thread to end its job on an item of interest while canceling all work items scheduled into a thread pool by relation to a particular object.

Algorithm Extensions

A natural extension of both the Coordinated and Independent Operation Modes is to use serializing synchronization objects enabled for sharing among processes. This makes the methods possible to be used for inter-process synchronization.

APPENDIX A

The precondition for the invention method is the S thread having one of serialization synchronization objects initially locked. Obviously, to achieve this, there is a need of an extra barrier-style synchronization that would prevent any W threads from starting operations on the object before the initial locking is completed by the S thread. This barrier style synchronization typically lacks priority inheritance—(which is one of the primary benefits of the invention) and that lack during one initial step could render the entire method's usefulness questionable.

To work around this problem one can employ one of the following approaches.

First, the initial barrier-style synchronization can be performed at program startup (or during similar algorithm or application subsystem initialization phases) when most of the functionality has not been launched yet and priority inheritance can be neglected for the participating threads yet.

If the method is to be launched at execution stages when there are no allowed priority inheritance neglect windows, the following algorithm can be used:

1. A Parent Thread (it could be one of the W threads or a common launcher thread for the Ws and the S) starts the S thread with priority high enough to be not less than any dynamic priorities the W threads can typically be raised to (the set of possible operating priorities for an application is known at design time or can be determined at application launch time in any case) having passed it as a parameter a regular event notification synchronization object available in the execution environment—the Start Confirmation Event (it could be either a barrier, or a conditional variable with state persistence, or anything-equivalent);

2. Since the S thread is started at elevated priority, priority inversions with Ws are impossible for it and the Parent Thread can enter a wait for the Start Confirmation Event to be signaled by the S thread;

3. The S thread locks a free Shared Mutex immediately at start start;

4. The S thread signals the Start Confirmation Event notification object and then lowers its priority to the intended execution level;

5. The Parent Thread receives the Start Confirmation Event signal and starts waiting for the Shared Mutex unlock (it executes the mutex lock call, followed by immediate mutex unlock call) thus propagating its dynamic priority to the S thread being the mutex current owner;

6. The S thread executes the initial object lock as required by the method preconditions and then unlocks the Shared Mutex the Parent Thread waits on.

The algorithm is completed with that: both the Parent Thread and the S thread may execute independently.

The algorithm described allows launching the S thread and accomplishing the method preconditions by it at any time without risk of priority inversions.

What is claimed is:

1. A method of issuing an event notification type synchronization signal by an entity capable of acquiring serializing synchronization objects, with aid of two or more serializing synchronization objects treated as a loop, with any one of said serializing synchronization objects being initially in acquired state by said entity and being referenced as a current object, comprising:
   a) acquiring a serializing synchronization object immediately succeeding the current object in the loop by the entity;
   b) releasing the current serializing synchronization object by the entity;
   c) making the serializing synchronization object immediately succeeding the current object in the loop to be referenced as the current object.

2. A method of waiting an event notification type synchronization signal issued with a method from claim 1 by an entity capable of acquiring serializing synchronization objects, provided the current object of the method from claim 1 as it was before said signal issuing is known, provided the method from claim 1 is restrained from starting over before the waiting completes, comprising:
- a) acquiring the current object of the method from claim 1 by the entity;
- b) releasing the current object of the method from claim 1 by the entity.

3. A method as in claim 1, wherein all the loop serialized synchronization objects are enabled for sharing among processes.

4. A method of issuing an event notification type synchronization signal by an entity capable of acquiring serializing synchronization objects, with aid of three or more serializing synchronization objects treated as a loop, with any one of said serializing synchronization objects being initially in acquired state by said entity and being referenced as a current object, comprising:
- a) trying to acquire without blocking a serializing synchronization object immediately succeeding the current object in the loop by the entity, skipping all the following method steps if the acquisition without blocking fails;
- b) releasing the current serializing synchronization object by the entity;
- c) making the serializing synchronization object immediately succeeding the current object in the loop to be referenced as the current object.

5. A method as in claim 4, wherein all the loop serialized synchronization objects are enabled for sharing among processes.

6. A method of waiting for an event of interest by an entity capable of acquiring serializing synchronization objects and capable of evaluating Boolean predicates, provided the event of interest is followed by an event notification type synchronization signal issued with either a method from claim 1 or a method from claim 4, said method being hereafter referenced as a signaling method, provided there are three or more serializing synchronization objects in the loop of the signaling method, with aid of a Boolean predicate to indicate the event of interest to have happened, comprising:
- a) acquiring without blocking a free serializing synchronization object from the loop of the signaling method by the entity, said formerly free serializing synchronization object from the loop of the signaling method being hereafter referenced as a running object;
- b) evaluating the Boolean predicate by the entity, skipping to the method step "g" if the evaluation yields True;
- c) acquiring a serializing synchronization object immediately succeeding the running object in the loop of the signaling method by the entity;
- d) releasing the running object by the entity;
- e) making the serializing synchronization object immediately succeeding the running object in the loop of the signaling method to be referenced as the running object;
- f) starting over from the method step "b";
- g) releasing the running object by the entity.

7. A method of acquiring without blocking a free serializing synchronization object from a loop of a signaling method from claim 6 for the method step "a" of a method from claim 6 by an entity capable of acquiring serializing synchronization objects, comprising:
- a) choosing any serializing synchronization object in the loop of the signaling method from claim 6, said serializing synchronization object in the loop of the signaling method from claim 6 being hereafter referenced as a trial object;
- b) trying to acquire without blocking the trial object by the entity, exiting the method with the formerly free serializing synchronization object acquired being the trial object if the acquisition without blocking succeeds;
- c) making a serializing synchronization object immediately preceding the trial object in the loop of the signaling method from claim 6 to be referenced as the trial object;
- d) starting over from the method step "b".

\* \* \* \* \*